(12) United States Patent
Frecska et al.

(10) Patent No.: US 6,224,299 B1
(45) Date of Patent: May 1, 2001

(54) TOOL WITH STRAIGHT INSERTS FOR PROVIDING HELICAL CUTTING ACTION

(76) Inventors: Laszlo Frecska, 21621 Cedar St., Lake Villa, IL (US) 60046; James T. Hartford, 534 N. Fifth St., Silverlake, WI (US) 53170

( * ) Notice: Subject to any disclaimer, the term of this patent is extended or adjusted under 35 U.S.C. 154(b) by 0 days.

(21) Appl. No.: 09/373,844

(22) Filed: Aug. 13, 1999

Related U.S. Application Data

(63) Continuation-in-part of application No. 08/954,590, filed on Oct. 20, 1997, now abandoned.
(51) Int. Cl.[7] ....................................................... B23G 5/06
(52) U.S. Cl. ................................. 407/41; 407/49; 407/61; 407/63
(58) Field of Search ........................... 407/24, 25, 41, 407/49, 42, 61, 63; 76/82, 104.1, 101.1

(56) References Cited

U.S. PATENT DOCUMENTS

| | | | |
|---|---|---|---|
| 2,567,167 | * | 9/1951 | Drader .................................... 29/105 |
| 3,461,748 | * | 8/1969 | Meyer .................................. 407/42 X |
| 3,561,297 | * | 2/1971 | Wilkins ............................... 407/42 X |
| 3,672,017 | | 6/1972 | Nielsen et al. . |
| 4,400,117 | * | 8/1983 | Smith ..................................... 407/49 |
| 4,472,093 | | 9/1984 | Hamilton . |
| 4,764,059 | * | 8/1988 | Wale ..................................... 407/42 |
| 5,112,162 | * | 5/1992 | Hartford et al. ....................... 407/49 |
| 5,325,748 | * | 7/1994 | Ehrenberg ............................... 82/13 |

* cited by examiner

*Primary Examiner*—Henry Tsai
(74) *Attorney, Agent, or Firm*—Leo J. Aubel

(57) ABSTRACT

A milling tool having replaceable straight elongated inserts that provide a helical cutting action. The tool has grooves formed at an angle with the longitudinal axis of the tool, the grooves have flat surfaces. Wedge means secure the respective inserts in respective grooves of the tool. The wedge means each have a plurality of apertures on the surface bearing against the insert, and coolant fluid under pressure is provided through said apertures to exit adjacent the cutting edge of said insert and against the work surface.

6 Claims, 9 Drawing Sheets

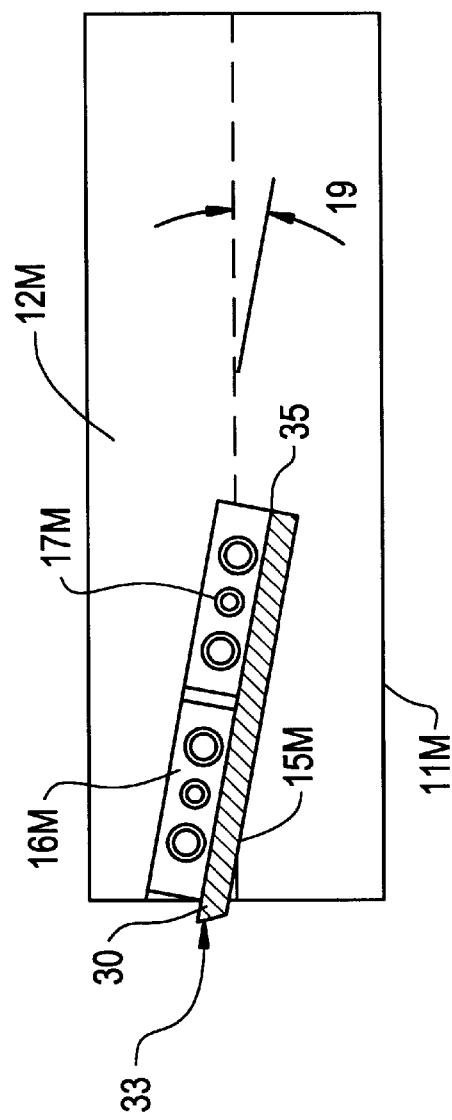
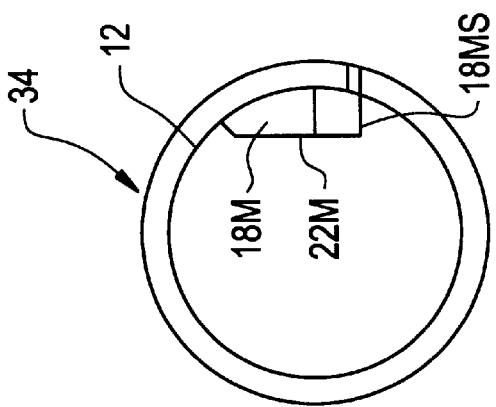

SECTION C-C

SECTION B-B

SECTION A-A

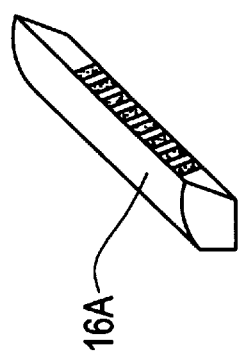
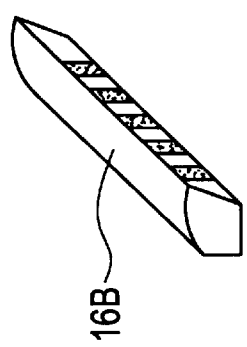
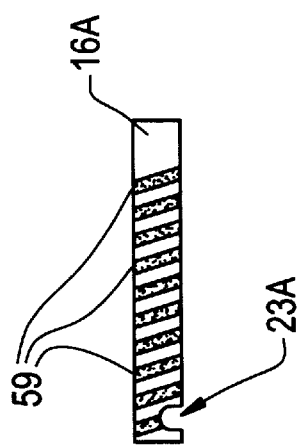
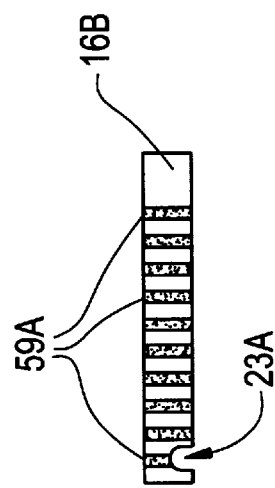
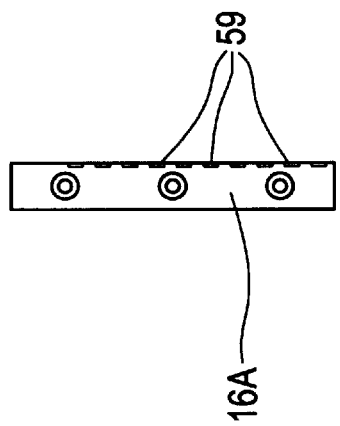
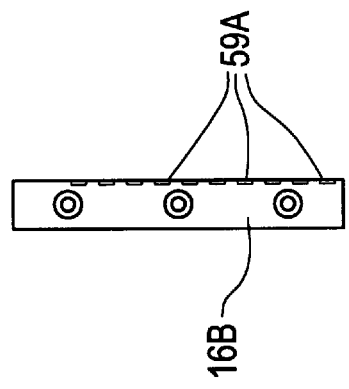

TOOL WITH STRAIGHT INSERTS FOR PROVIDING HELICAL CUTTING ACTION

The present invention is a continuation-in-part of pending U.S. patent application Ser. No. 08/954,590, filed Oct. 20, 1997, now abandoned, in the names of Frecska and Hartford, titled "Helically Fluted Insert and Tool" which discloses a tool with a plurality of straight elongated inserts having cutting edges.

BACKGROUND OF INVENTION

Known prior art such as U.S. Pat. No. 3,672,017 to Nielsen et al. and U.S. Pat. No. 4,472,093 to Hamilton disclose tools having curved cutting inserts and scalloped cutting inserts. Such inserts have the following draw backs:
 a) difficult to make,
 b) because of the curvatures it is difficult to evenly wedge the insert in the associated tool thus resulting in uneven forces and pressures on the insert which results in breakage and a shortened insert life, and
 c) the inserts have to be ground while in the operating tool; the inserts can not be taken out of the operating tool, ground and then replaced.

Another patent of interest with respect to the inventive concept is U.S. Pat. No. 5,325,748 to Ehrenberg which discloses a tool having one single straight bar cutting insert offset from the longitudinally axis of the tool to provide a helical cutting action. The Ehrenberg tools provide a single cutting action during rotation of the tool. For high speed operations, it has been found necessary to have a milling tool with a number of cutting inserts or blades on its periphery. For example, the inventive tool is operable at 22,000 rpm while the single insert Ehrenberg tool can not be satisfactorily operated above 13,000 rpm. One reason for this is that in the Ehrenberg tool a single off-center insert is mounted on the periphery of the tool, and therefore the tool is not balanced. Further, the structure of the Ehrenberg can not provide even two cutting inserts, since any additional inserts mounted on the tool would destroy the tool shank.

SUMMARY OF THE INVENTION

The present invention discloses a rotatable tool having straight elongated inserts for cutting in an efficient helical mode, and having means for providing coolant at a high pressure to the cutting edge of the inserts. The inventive tool has a plurality of grooves or slots, and the slots have flat bottom surfaces parallel to the axis of the tool for receiving the cutting inserts. The inserts are elongated, substantially rectangular, straight members and include a cutting edge and surface. Each of the inserts is secured in a respective slot by one or more suitable wedges. In one embodiment, apertures are formed in the wedges securing the inserts, and liquid coolant at a high pressure is forced through said apertures to impinge on the cutting edges of the inserts and the material being cut.

The foregoing features and advantages of the present invention will be apparent from the following more particular description of the invention. The accompanying drawings, listed herein below, are useful in explaining the invention.

BRIEF DESCRIPTION OF THE DRAWINGS

FIGS. 4A and 4B are respectively an end view and a side view of a master tool used in making the inventive inserts;

FIGS. 13A, 13B and 13C are views showing a first embodiment of the wedges of the invention;

FIGS. 14A, 14B and 14C are views showing a second embodiment of the wedges of the invention; and, FIG. 15 shows the inventive tool including the wedges, the cutting inserts, and the coolant holes.

DESCRIPTION OF THE INVENTION

The present invention relates to a cylindrical tool including inserts or insert blades with helically fluted cutting surfaces for use such as in cutting and milling operations. It has been found that helical cutting action improves the cutting operation on a workpiece in various ways. One explanation of the improved operation with helical tools, as compared to non-helical cutting tools, is that the cutting edge of the helical cutter blade is cutting into the metal in a serial manner. Because of the helical configuration of the cutting blade, each portion of the cutting edge of the blade engages the workpiece sequentially. That is, the cutting edge of the cutter blades cuts progressively through the workpiece. This is in contrast to having the whole cutting edge of the cutter meeting the workpiece as one solid frontal wall, as is the case with the standard non-helical cutter blades. Two important advantages resulting from using helical cutting surfaces are a) the cutter tool can be operated at a higher speed, and b) the helical cutting action results in smoother cuts with finer chips or swarf.

As described above, cited prior art provides helical cutting action, however the inserts themselves are curved or spiral in configuration. Such inserts are difficult to make, and difficult to evenly wedge and support in the tool; a consequence is extensive breakage. Further, for high speed operation a tool with multiple blades or cutting inserts is required, a single cutting blade is subject to intensive wear, and does a much slower job.

Figure 1:
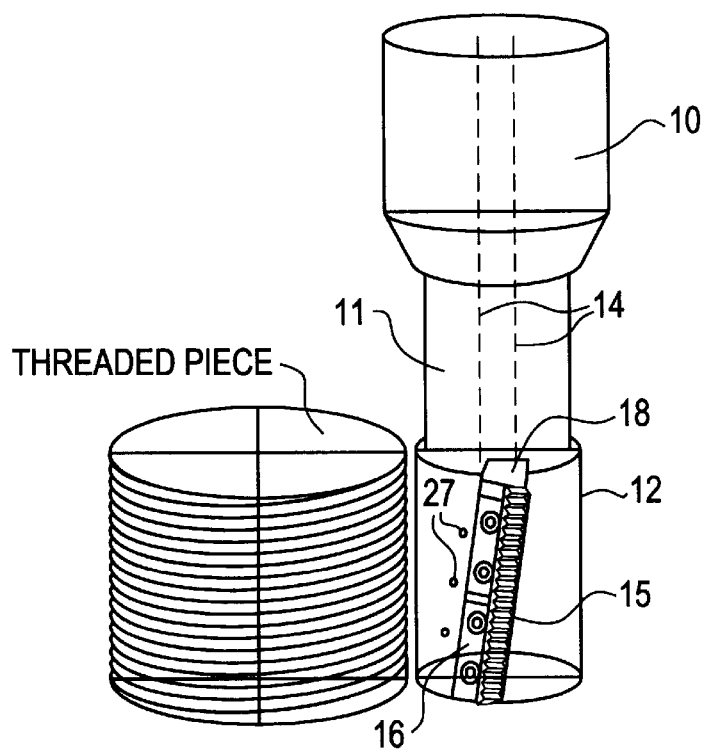
FIG. 1 is an isometric view of the inventive tool mounted on a rotating shaft of a milling machine; the tool includes inserts for milling threads; and, FIG. 2 is an isometric view of the inventive tool mounted on a rotating shaft of a milling machine; the tool includes inserts for removing material from a work piece.

FIG. 1 shows a view of the inventive cylindrical tool 11 having inserts 15 with cutting surfaces for making threads.

Figure 2:
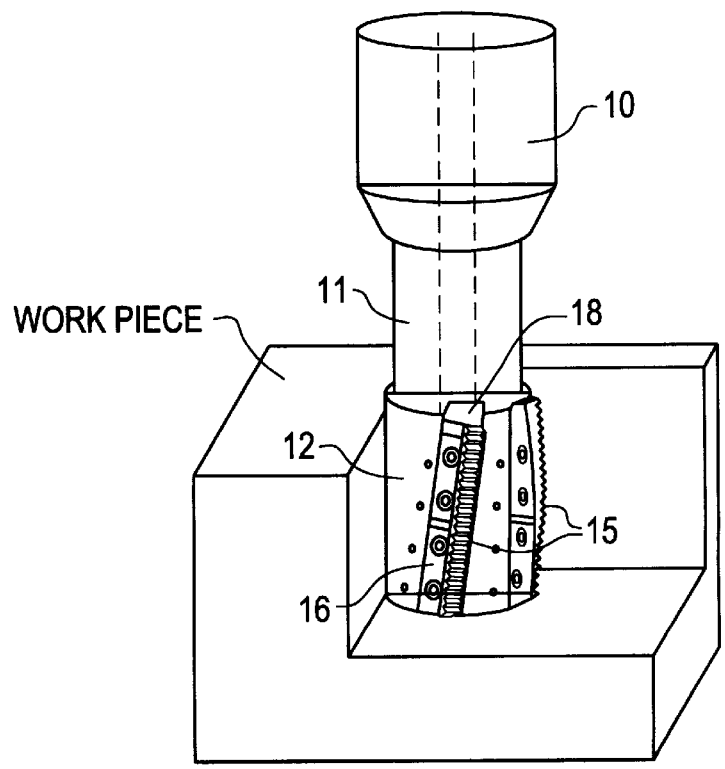

A preferred embodiment of tool 11 includes twelve separate inserts 15 mounted in spaced relation on the periphery of the tool body 12; however, for purposes of clarity in the drawing only one insert 15 is shown in FIG. 1. Tool 11 is mounted, in a known manner, in a machine having a rotating shaft 10. As mentioned above, the tool 11 with inserts 15 can be universally used anywhere a tool with a helical cutting action is desired. FIG. 2 shows the inventive tool 11 with inserts 15 for use in hog milling operations.

The inventive tool 11 includes a tool or mill body 12, inserts 15, wedges 16, and coolant holes 27 for receiving and dispensing the coolant, as is known. Dotted lines 14 (FIG. 1) indicate coolant passages leading to holes 27, as is known. Inserts 15 are mounted in slots or grooves 18 on the periphery of the tool 11. Importantly, the basic form of the blanks, from which the inserts 15 are made, is that of a straight elongated rectangular bar, as will be further explained. The grooves or slots 18 have and open top, parallel sides and a flat bottom surface. In a commercial embodiment (FIG. 11) twelve inserts 15 are mounted in their respective grooves 18 have a depth, or extend down from the periphery of the tool 11 to the center longitudinal axis, less than one fourth of the radius of the tube.

Figure 3B:
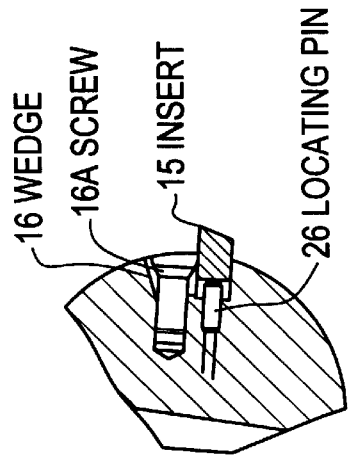
FIG. 3B is an end view, partly in cross section taken along lines A—A of FIG. 3A.
Figure 3A:
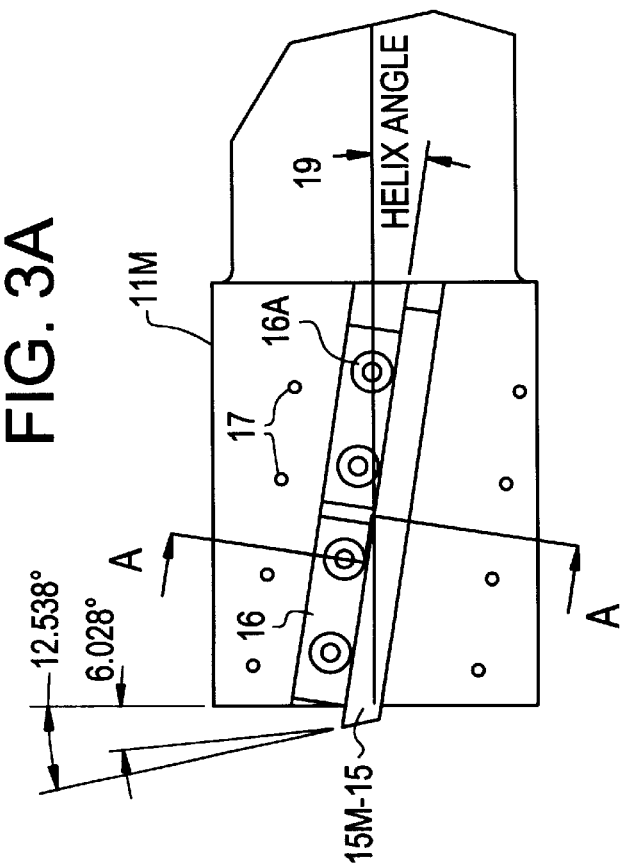
FIG. 3A is a side view of the inventive insert.

Referring now also to FIG. 3A, the inserts 15 are mounted at a selected acute angle with relation to the longitudinal axis of the tool 11 and is referred to herein as the helix angle 19. In the embodiment shown, the inserts 15 are positioned in respective slots or grooves 18 at helix angle 19, which is offset about ten (10) degrees from the longitudinal axis of the tool 11, as indicated in the various drawing figures. The size of the helix angle 19 is not to be considered as limiting.

Figure 5:
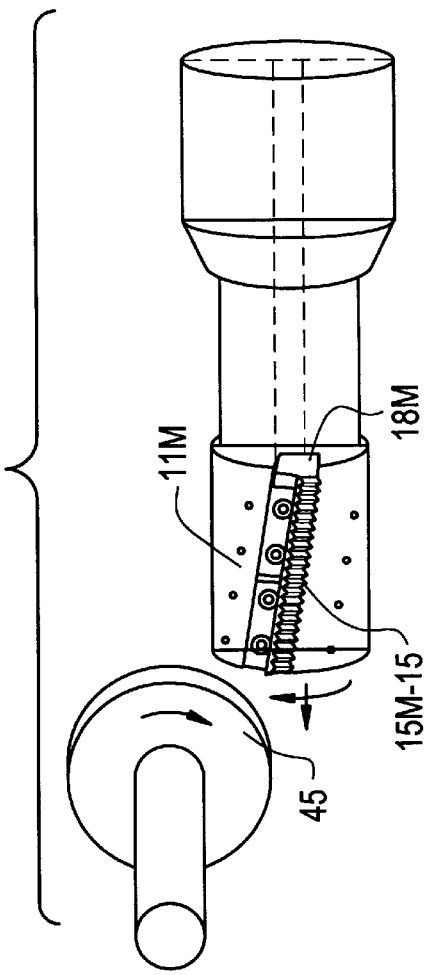
FIG. 5 depicts the master tool with an insert blank being fed to a grinding wheel.

FIGS. 3A, 3B and 5 depict a "master" tool 11M. Master tool 11M is substantially identical to the operating tool 11 shown in FIGS. 1 and 2. It is an important concept of the invention that the inventive inserts 15 are made or ground from blanks 15M that are mounted on a master tool 11M. The inventive inserts 15 are thus formed or made by a method that includes a) mounting the insert blanks 15M in slots or grooves 18M (see also FIGS. 4A and 4B) formed on the master tool 11M, and b) feeding the inserts mounted on the master tool 11M to a grinding wheel 45, as indicated in FIG. 5.

FIG. 3A includes the numbering 15M–15 to indicate that insert blank 15M becomes insert 15. For purposes of further explanation, a depiction of an end view of master tool 11M is shown in FIG. 4A before an insert blank 15M is mounted therein. A side view of tool 11M is shown in FIG. 4B. Tool 11M includes a mill body 12M, wedge 16M, and insert 15M from which the inventive inserts 15 are formed. As mentioned above, the insert blank 15M is a straight elongated rectangular bar. Only one insert blank 15M is shown for clarity of drawings.

To initiate the operation of making the inserts 15, an insert blank 15M is mounted in a groove or slot 18M formed at the helix angle 19 in master 11M, as indicated in FIGS. 4A and 4B. Again as mentioned above, the master tool 11M is essentially the same as the milling tools 11; that is, it is the same as the operating tools in which the inserts 15 are to be used for milling. Also, the helix angle 19 of the master tool 11M is the same as the helix angle of the operating tools 11.

As shown in FIGS. 4A and 4B, a blank insert 15M is mounted on master 11M in one of the slots or grooves 18M that have a flat bottom surface 22M. The bottom surface 22M is parallel to the axis of the master tool 11M. Note also from FIG. 4A, that the side 18MS of the groove 18M on which the insert blank 15M abuts is also straight and flat.

The flat bottom and flat side of groove 18M enables the insert blank 15M to be mounted in the respective groove by suitable wedges 16M and screws 17M.

After the insert blank 15M is mounted in master tool 11M, the next step of the operation is to feed blank 15M to the grinding wheel, as indicated in by the arrows in FIG. 5, in a forward and turning moment. As depicted in FIGS. 3A, 3B, 4A, 4B and 9, an insert 15 formed from blank 15M will have a cutting surface 30 extending outwardly from the periphery of tool 11. Insert 15 will provide a tool cutting diameter 34 (see FIGS. 3A and 4A) defined by the forward cutting point or tip 33 and cutting surface 30 of insert 15. The rear or trailing cutting tip of insert 15 is labeled 35. As noted above, the numbering 15M–15 in FIGS. 3A and 5 indicates that the insert blank 15M is fed to a grinding wheel and becomes insert 15.

Refer now also to FIGS. 6, 6A–6C. As is known, the radial rake angle of the insert 15 may be defined as the angle in degrees that the tooth face 30 deviates from a radial line to the cutting edge. The rake angle utilized is dependent on the intended speed of operation and the material the insert is intended to cut. The rake angle and the relief angles for insert 15 are also shown in the section views of FIGS. 6, 6A, 6B and 6C and the isometric views of FIGS. 9 and 10. The design of the relief angles is selected dependent on the intended use of the insert.

Figure 6:
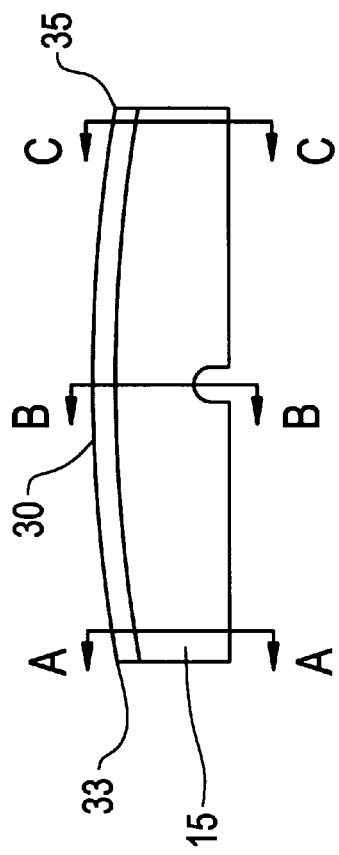
FIG. 6 shows an insert after helical fluting and cam grinding, and sections A—A, B—B and C—C of FIGS. 6A, 6B and 6C show a cross section of the insert at the position indicated in FIG. 6.
Figure 6C:
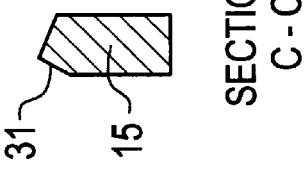
Figure 6B:
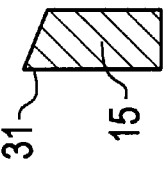
Figure 6A:
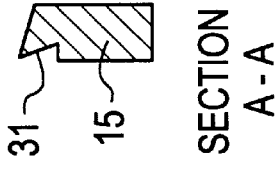

The rake angle 31 of the forward cutting tip 33 of surface 30 is shown as section A—A of FIG. 6 and FIG. 6A. The rake angle 31 varies substantially uniformly from positive to negative (positive being considered as the angle inclined toward the direction of rotation). In other words, relative to the rotation of tool 15, the forward or outer cutting tip 33 is ahead of the inward point of the angle surface. The rake angle 31 then smoothly varies to be preferably zero at the mid point of insert 15, as shown as Section B—B of FIG. 6; and, the rake angle 31 continues to vary smoothly to become a negative rake angle "b" at the rear cutting tip 35 is shown as section C—C of FIG. 6.

As indicated in FIG. 3A, in one embodiment, the insert 15 has a radial rake angle 31 angled at a positive 6.028 degrees that smoothly varies to an angle of zero degrees at the center of the insert and to 12.538 degrees in the opposite direction, as shown in FIG. 6. Thus the rake angle varies from positive angle at the outward tip 33 of insert 15 to a negative angle at the inward end 35 of insert 15.

Figure 7B:
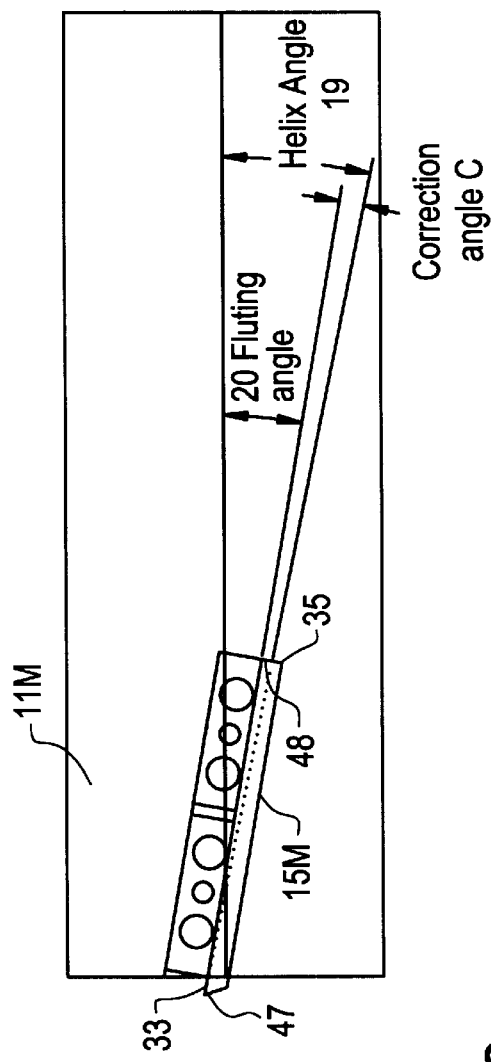
FIGS. 7A and 7B are views similar to FIGS. 4A and 4B, respectively, and are useful in explaining the inventive concepts.
Figure 7A:
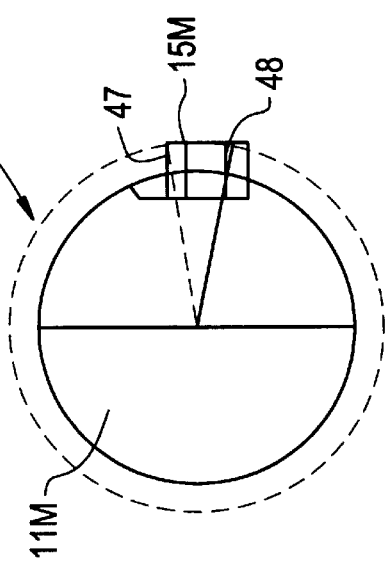

Refer now to FIGS. 7 for a further explanation of the inventive method of forming the inserts 15. Assume theoretically that the fluting angle 20, at which the blanks 15M are ground to provide a helical cutting surface, were the same as the helix angle 19. The material that would have to be removed from blank 15M to form a proper cutting surface 30 is indicated by numeral 47 in FIG. 7A. Also, FIG. 7A shows that theoretically, rather than removing material to form the rear portion of insert blank 15M, material would have to be added, as at 48, to form the rear cutting surface and edge of insert 15. Obviously, this is impractical in a grinding operation.

Figure 8:
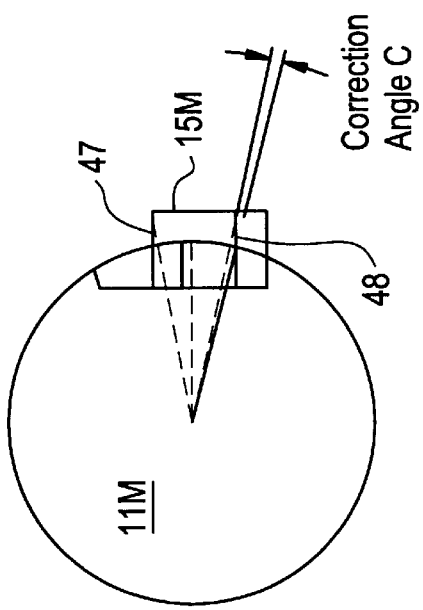
FIG. 8 is a view similar to FIG. 4A, and is useful in explaining the inventive concept of providing a correction angle to the positioning of the insert.

Accordingly, and as shown in FIGS. 7B and 8, in order to minimize the amount of material 47 that has to be removed from the forward cutting surface and cutting tip 33, and also to provide material for grinding the rear cutting surface and rear cutting tip 35 of blank 15M, a correction "C" is utilized in the grinding operation. The insert blank 15M is moved to be at an angle, the fluting angle 20, which is less than the helix angle 19. The grinding is thus done at the fluting angle 20, which is offset from, the helix angle 19. Referring to FIG. 8, the material to be removed from the area 47 of insert blank 15M is minimized, and material is made available in area 48 of insert blank 15M which can be removed from the rear cutting surface 33 and tip 35 on insert blank 15M to form insert 15.

As shown in FIG. 6, the insert blank 15M is ground to develop an insert 15 with a cam cutting surface 33; such cam surface 33 is needed to provide the proper helical cutting action. Because of the clockwise rotation of the tool 11 and the angled position of the insert 15, the lower edge of insert 15 (as oriented in FIG. 1) will engage the workpiece rotationally ahead of the remaining portions of the insert 15. As the following portions of insert 15 rotate to the radial position at which the leading edge of insert first cut into the workpiece, the portions of the insert have to be effectively varied in height, as indicated in FIG. 6, so that the cut into the workpiece will continue to be of the same depth, as is known in the art.

Figure 9:
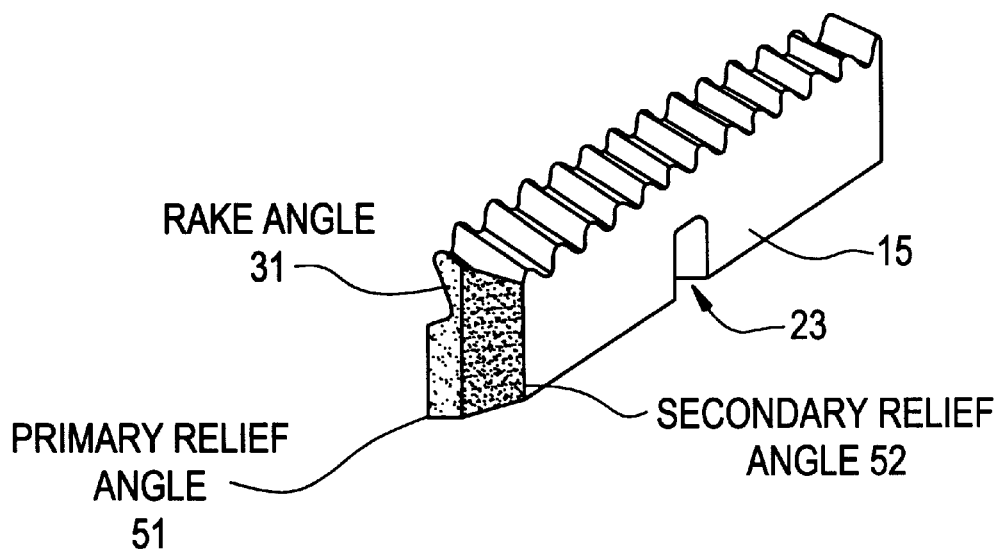
FIGS. 9 and 10 are isometric views, partially in section, of the inventive insert to show the primary and secondary relief angles.
Figure 10:
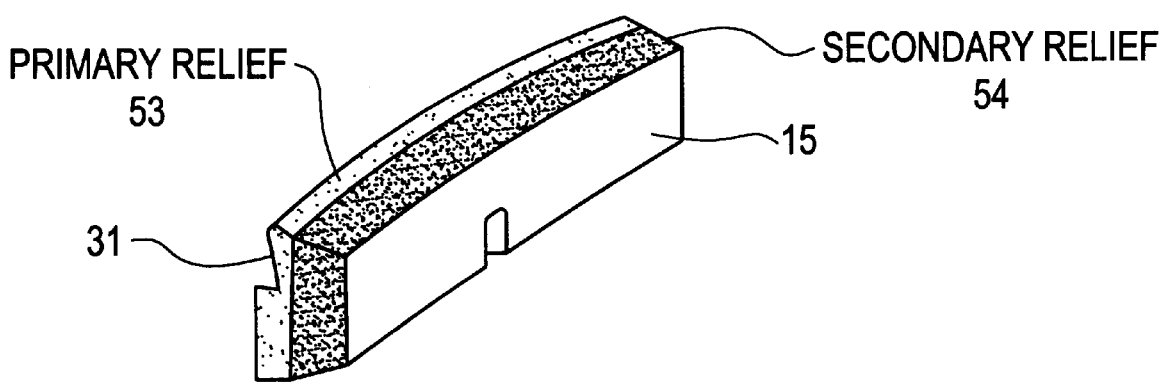

An isometric view of an inventive insert 15 is shown in FIG. 9. FIG. 9 indicates the primary and secondary end relief angles 51 and 52 of insert 15. The primary and secondary side relief angles 53 and 54 are indicated in FIG. 10. The end and side relief angles are respectively the same, and are determined dependent on the speed at which the insert 15 is designed to operate and the material that it is intended to cut, as is known in the art.

After the insert 15 has been ground it is ready for use in an operating tool 11 that is the same as the master tool 11M. The operating tools 11 also have slots or grooves 18 with flat bottom surfaces and flat sides that are similar to grooves 18M in master tool 11M. The wedges 16 used in the milling tool 11 also have a flat solid surface that bears solidly against the insert 15 to firmly secured the insert in position.

In certain embodiments, two wedges 16 and the associated screws are used to secure each insert 15. While a single wedge may be used, the use of shorter wedges 16 provides a means of providing a more even wedging support along the length of the insert 15, and minimizes any tendency toward developing uneven stresses on any section of the insert. As described above, one important feature of the inventive inserts over the curved inserts of the prior art is that each of the inserts can be taken out as it wears. The worn insert can be replaced, and the old insert can be re-sharpened at a separate station, and reused in another tool or returned to its original tool. Cutting inserts or insert blades are subject to intensive use and consequently wear down, and tools having replaceable cutting inserts are in demand. The invention provides improved inserts for helical grinding which inserts are useful with various types of rotatable machine tools to do general milling as well as thread milling. Also as mentioned above, the inventive inserts comprise straight elongated inserts that are adapted to be mounted firmly and solidly in a straight flat groove of the tool body to provide helical grinding and threading actions. Further, the straight inserts 15 that provide the helical cutting action are mounted on a flat surface formed in the tool body. All this minimizes stress on the insert and extends the life and serviceability of the insert while providing all the advantages of helical cutting action.

As indicated in FIG. 9, inserts 15 each include an aligning or positioning slot 23 that is positioned on a suitable locating pin 26 (see also FIG. 3B) in the respective slots 18. The assembly and re-assembly of the inserts 15 on tool 11 is efficient and accurate; that is, the inserts 15 are quickly replaceable, with the new or replacement insert being precisely mounted in position.

Further, other advantages have been obtained with the inventive tool 11. First, the inventive tool can operate at a higher speed and therefore the work can be done faster; and also, the tool body 12 can be used almost indefinitely since the cutter blade inserts are replaceable.

Figure 11:
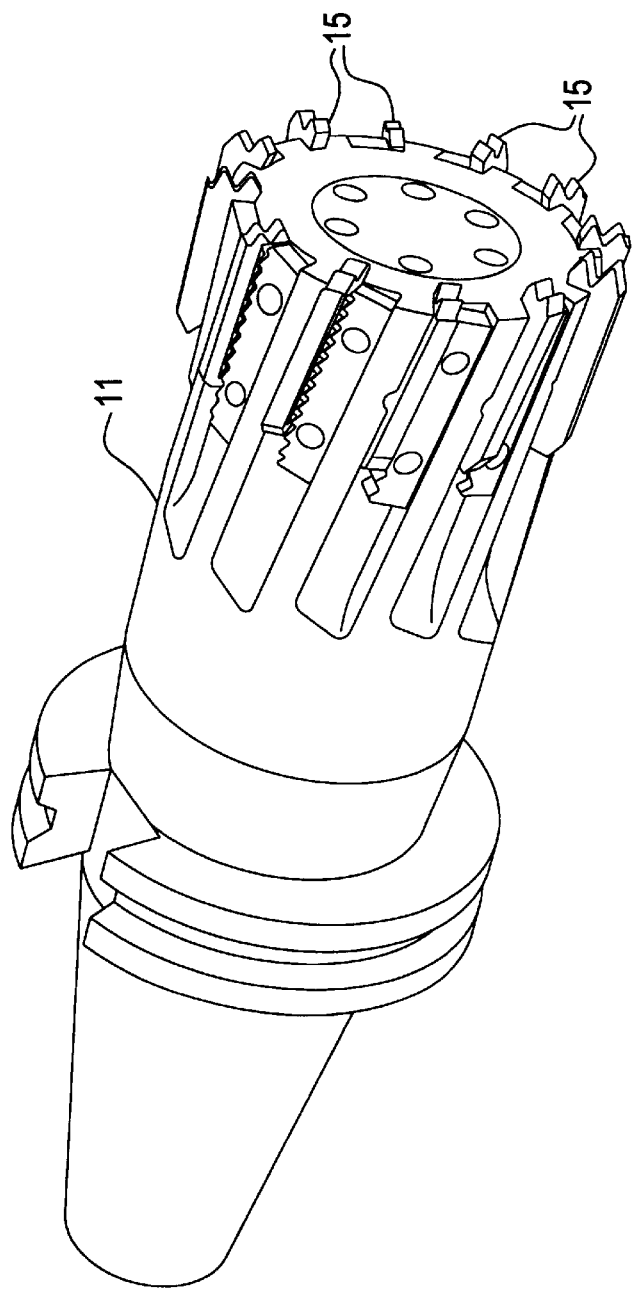
FIG. 11 is sketch of an end view of a commercial embodiment of the tool of FIG. 2 showing twelve inserts mounted on the tool body.

FIG. 11 shows a commercial embodiment of the tool 11 having twelve inserts 15.

It has been found that inserts of high quality can be made in accordance with the invention, and can be suitably produced in large quantities, efficiently and economically. Inserts made in accordance with the invention fit better in the associated tool, are longer lasting and provide machining of higher quality then any known prior art inserts with helical fluting.

Figure 12:
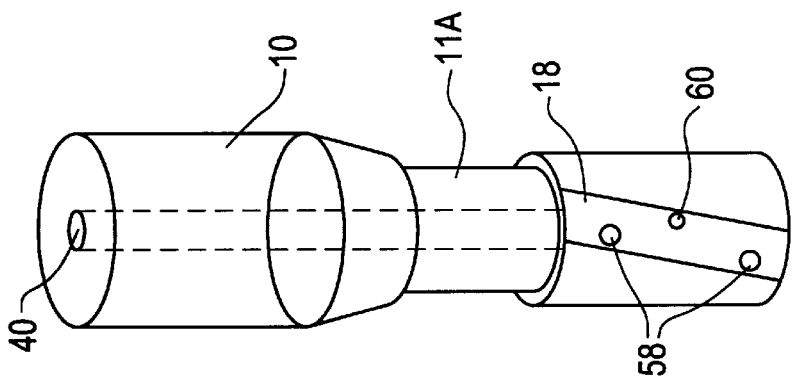
FIG. 12 is a view of the tool showing the apertures for the coolant.

FIG. 12 shows the tool 11 without the insert and wedges. In FIG. 12 tool 11 shows the straight rectangular and open groove 18 and shows the coolant conveying channel 14, screw holes and fluid hole 60. As explained above, during the cutting or milling operation coolant at high pressure is provide through channel 14. FIGS. 13A, 13B and 13C show three views of the wedge 16A. Wedge 16A is generally similar to wedge 16 but includes apertures 59 on the face of the wedge 16 which abuts against the cutting insert 15, see also FIG. 15. Apertures 59 are conveniently formed to be parallel to each other and to extend from the bottom to the top of the wedge. Coolant at a high pressure is channeled through apertures 59 onto the cutting surface of insert 15. The apertures are formed as recesses or grooves on the side of the wedge.

In the embodiment of FIGS. 13A, 13B and 13C, the apertures 59 are slightly angled, with respect to the normal of the longitudinal axis of the wedge. In the embodiment of the wedge 16B shown in FIGS. 14A, 14B and 14C, the apertures 59A are normal or perpendicular to the longitudinal axis of the wedge 59A. The wedges each include a locating recess 23A.

Figure 15:
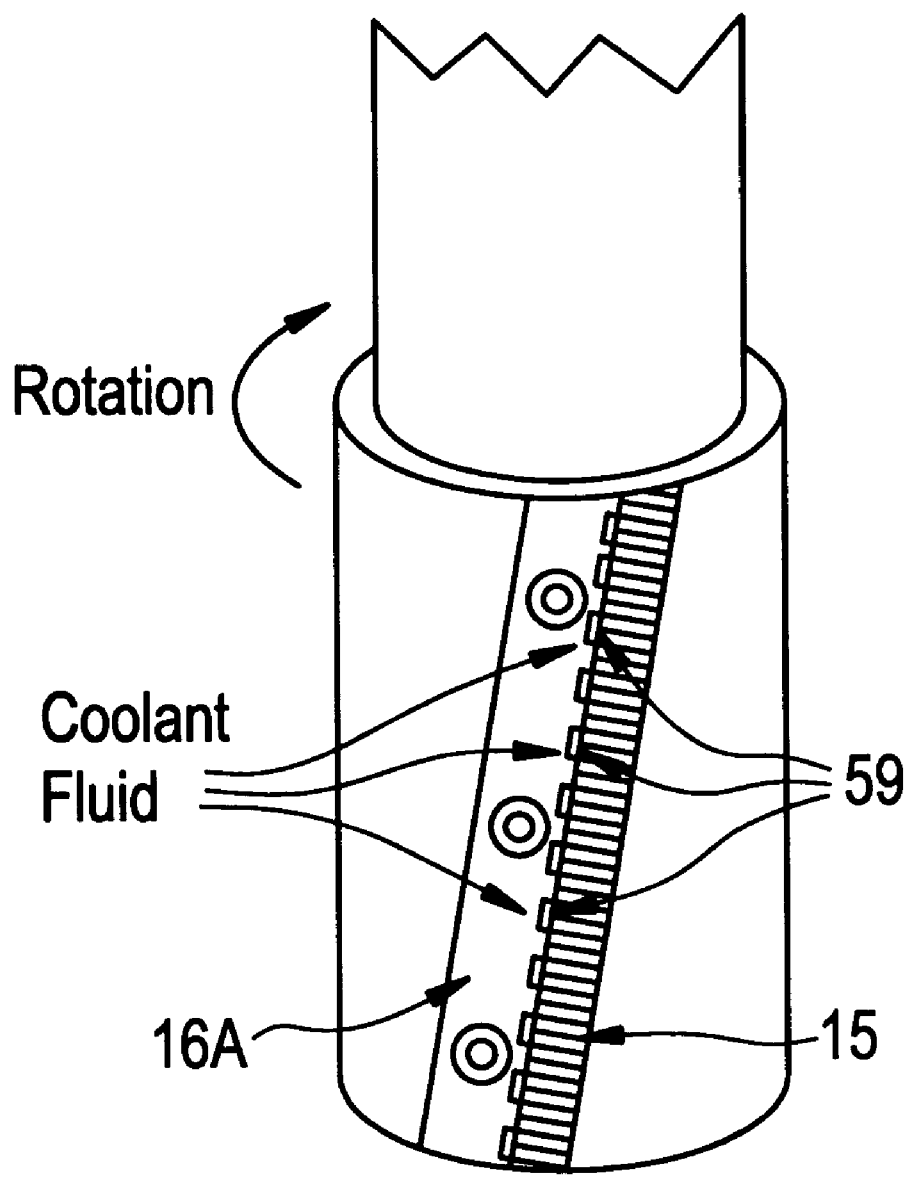

FIG. 15 shows the inventive tool 11 with the insert 15 and the wedge 16A mounted in position. The apertures 59 are indicated in relatively exaggerated size to clearly show their relation to the insert and the wedge. While the apertures 59 are shown as rectangular in shape, circular or oval apertures or other configurations are also used. Note also that in the embodiment of FIG. 15 a single wedge 16A is used in each slot.

Coolant at a relatively high pressure, in one embodiment the pressure is over 2000 pounds/square inch, is provided to the tool 11 through channel 14. This high pressure coolant is channeled through hole 60 and the apertures 59 onto the cutting edge of the inserts 15 and onto the workpiece. The tool 11 is especially useful in milling hard material such as titanium. It was found that the use of the inventive structure with the high pressure coolant increased the rate of cut significantly, in the order of multiples over the prior art, dependent on the material being processed. Another advantage of the inventive apparatus is that the machines can be run at a higher surface speed. Further, the use of high pressure coolant increases the life of the inserts.

While the invention has been particularly shown and described with reference to a preferred embodiment thereof it will be understood by those skilled in the art that changes in form and detail may be made therein without departing from the spirit and scope of the invention.

What is claimed is:

1. A cylindrical milling tool mountable on a milling machine for rotation about its longitudinal axis for milling a workpiece, a plurality of cutting inserts mounted on the periphery of said tool for providing a helical cutting action, the body of said tool having a plurality of spaced straight grooves formed on its periphery and equidistant from one another, said grooves extending at an acute angle with respect to the longitudinal axis of said tool, said grooves having two parallel sides, an open top and a flat bottom surface, said grooves extending from the periphery of said tool toward the tool axis to a depth less than one fourth of the radius of said tool, said plurality of cutter inserts each comprising a straight elongated rectangular member having a cutting edge, respective ones of said inserts mounted in said grooves, said inserts each providing a cutting surface with cutting edges extending transverse to the longitudinal axis of said tool to provide a helical cutting action wherein each cutting edge progressively engages the workpiece, and wedge means for wedging and mounting said inserts in respective ones of said grooves.

2. A milling tool for providing a helical cutting action, said tool comprising a cylindrical body adapted for rotatable operation in a milling machine, the body of said tool having a plurality of spaced straight grooves formed on its periphery, said grooves being equidistant from one another, said grooves extending at an acute angle with respect to the longitudinal axis of said tool, said grooves having two parallel sides, an open top and a flat bottom surface, a plurality of cutter inserts each comprising a straight elongated rectangular member having a cutting edge, respective ones of said inserts mounted in said grooves, said inserts each providing a cutting surface with cutting edges extending transverse to the longitudinal axis of said tool to provide a helical cutting action wherein each cutting edge progressively engages the workpiece, and wedge means for wedging and mounting said inserts in respective ones of said grooves.

3. A milling tool as in claim 1 wherein said wedge means have a plurality of apertures on the surface abutting respective inserts, means for providing coolant fluid under high pressure at over 2000 pounds/square inch through said apertures to exit adjacent the cutting edge and the workpiece.

4. A cutting insert for a milling tool as in claim 1, wherein said wedge means comprises at least two wedges spaced from one another and separately affixed to said tool body whereby the insert is more evenly wedged and supported in said groove.

5. A method of grinding inserts for a milling tool of claim 1, said method consisting of the steps of mounting blanks of said inserts in a master tool which is substantially identical to said milling tool, and grinding the blank at and acute angle relative to the longitudinal axis of said master tool as said master tool is rotated.

6. A method as in claim 5 wherein each insert blank is ground at an angle offset from said acute angle.

\* \* \* \* \*